March 27, 1951 G. A. HUMASON 2,546,638
WELLHEAD CONSTRUCTION
Filed Oct. 15, 1945 2 Sheets-Sheet 1

Inventor
Granville A. Humason
By
E. V. Hardway
Attorney

March 27, 1951     G. A. HUMASON     2,546,638
WELLHEAD CONSTRUCTION
Filed Oct. 15, 1945     2 Sheets-Sheet 2
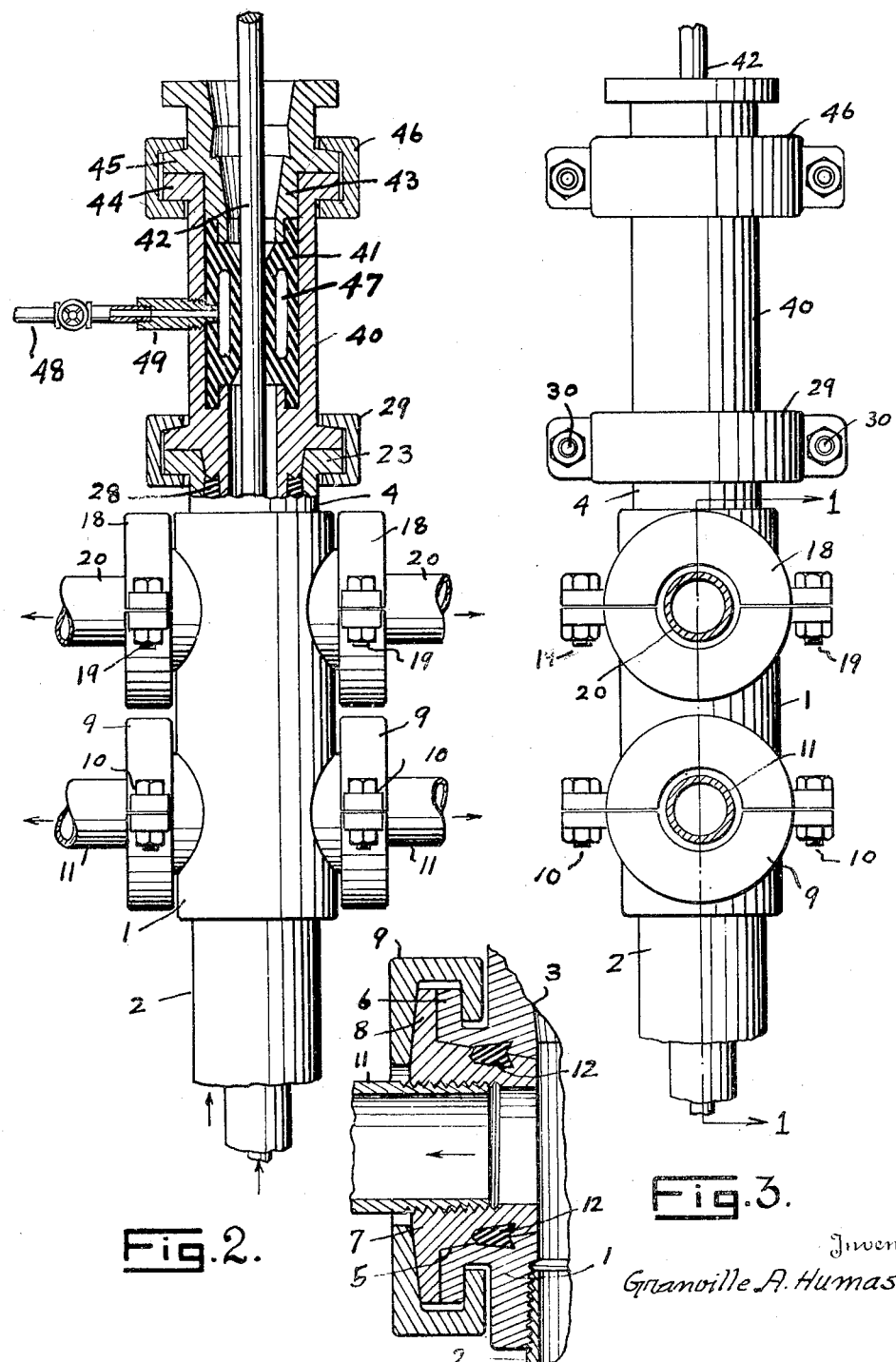

Patented Mar. 27, 1951

2,546,638

UNITED STATES PATENT OFFICE 2,546,638

WELLHEAD CONSTRUCTION

Granville A. Humason, Houston, Tex., assignor of one-half to Edgar E. Townes, Jr., Houston, Tex.

Application October 15, 1945, Serial No. 622,442

5 Claims. (Cl. 166—15)

This invention relates to well head construction.

An object of the invention is to provide a combined casing head and tubing head secured together in a novel manner.

It is another object of the invention to provide novel means for connecting the flow lines to the well head construction so that they may be readily assembled therewith or disconnected therefrom, the connection being such as to prevent the leakage of fluid therethrough.

It is another object of the invention to provide, in well head construction, of the character described, a flow line connection which will secure the casing head and tubing head in their proper fixed relation to each other.

It is a further feature of the invention to provide in equipment of the character described a novel type of valve assembly for controlling the flow of well fluid through the head.

With the above and other objects in view the invention has particular relation to certain novel features of construction, arrangement of parts and use, an example of which is given in this specification and illustrated in the accompanying drawings wherein—

Figure 2 is a side view, partly in section, showing the controlling valve of Figure 1 removed and pump sucker rod packing installed.

Figure 3 is a side elevation of the form shown in Figure 2; and

Figure 4 is a fragmentary, vertical, sectional view illustrating a slightly modified form of flow line connection.

Figure 1:
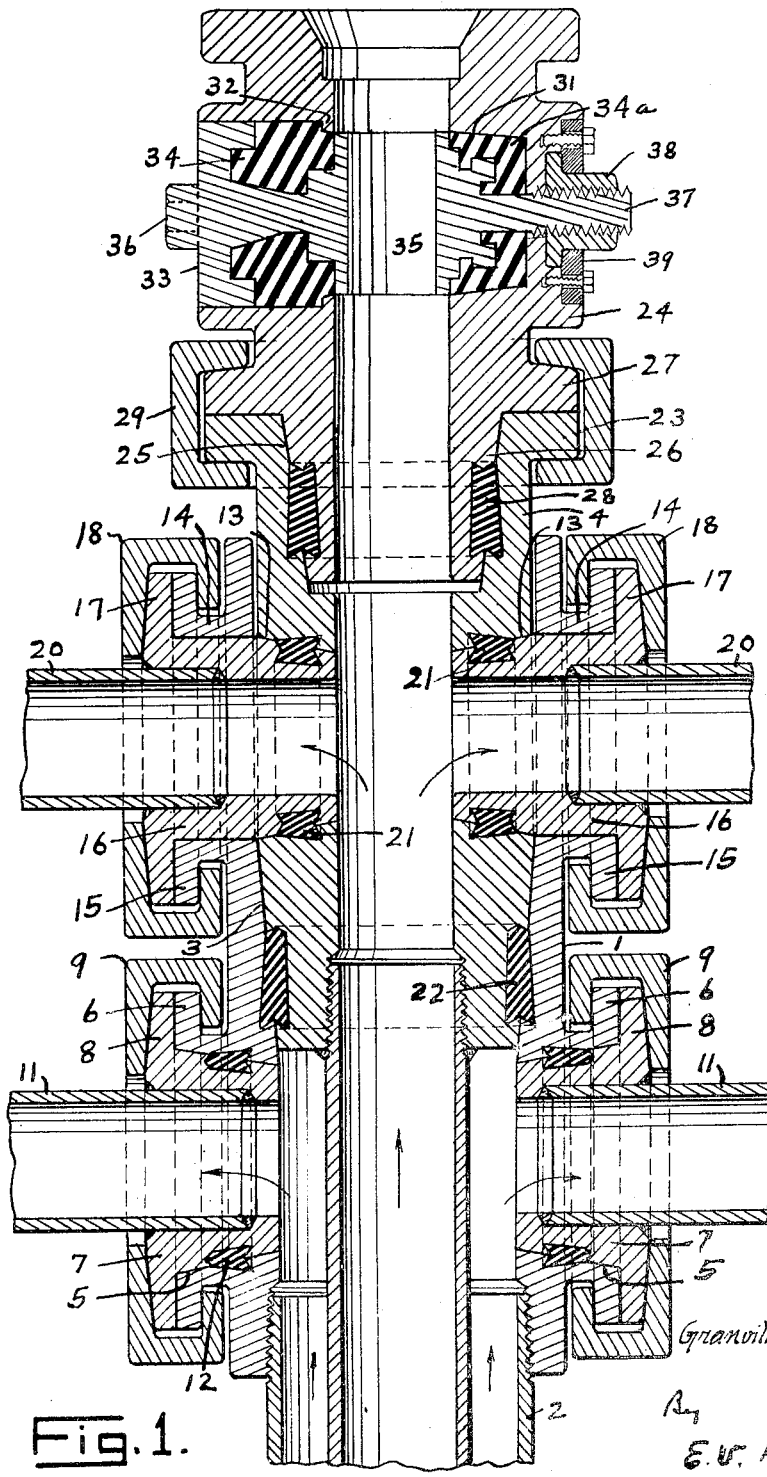
Figure 1 shows a casing head and tubing head construction in section as indicated by the section line 1—1 of Figure 3, and also showing the flow controlling valve installed.

Referring now more particularly to the drawings wherein like numerals of reference designate the same parts in each of the figures, the numeral 1 designates a casing head which is secured to the upper end of the casing 2 and which has an inside downwardly tapering seat 3.

The numeral 4 designates a tubular tubing head which is fitted into the casing head and whose lower end is externally tapered to seat within the seat 3.

Beneath the lower end of the tubing head the casing head is provided with lateral projections 4', 4', having the outwardly flared seats 5, 5 and around said seats are the external annular flanges 6, 6 which are formed integrally with said seats and are spaced outwardly a substantial distance from the casing head.

Fitted into the seats 5 are similar tubular fittings which are designated generally by the numerals 7. These fittings have the external annular flanges 8, 8 at their outer ends which adjoin the flanges 6 when the fittings are assembled in the head. These adjoining flanges are surrounded and clamped together by the clamp housings 9, 9. These housings are preferably formed of sections which are clamped together by the clamp bolts 10, 10 which have heads on one end and nuts on the other end, as shown in Figures 2 and 3. The outer sides of the flanges 8 are tapered outwardly and the clamp housings 9 have inside grooves whose outer sides taper outwardly and wedge against the tapering outer sides of said flanges 8 when the housing sections are clamped together so as to secure the fittings in place.

There are the out flow lines 11, 11 whose inner ends are fitted into said fittings 7 and are either welded therein, as shown in Figure 1, or threaded therein, as shown in Figure 4.

It will be noted from an inspection of Figures 1 and 4 that the seats 5 and the corresponding fittings therein have registering annular grooves in which the packing rings 12, 12 are fitted and these rings have the inwardly directed inner and outer lips, as shown, to prevent the escape of well fluid under pressure around said fittings. The flow lines 11, 11 may be readily disconnected from the head by removing the sectional housings 9.

Above the seat 3 the tubing head is provided with lateral openings surrounded by the outwardly flared seats 13, 13 which are formed integral with the tubing head and opposite said seats the casing head is provided with the tubular projections 14, 14 which are formed integrally therewith and which have the external annular end flanges 15, 15 spaced outwardly from the casing head body.

Fitted through the connections 14 are the tubular fittings 16, 16 whose inner ends are tapered and fit into the seats 13. The outer ends of the fittings 16 have the external annular flanges 17 which adjoin the flanges 15. These flanges are clamped together by means of the clamp housings 18, 18 which are formed of sections bolted together by the clamp bolts 19 which have heads on one end and nuts screwed on their other ends. The outer sides of the flanges 17 taper outwardly and the housings 18 have inside annular grooves whose outer sides taper outwardly and wedge against the tapering outer sides of said flanges 17 so as to clamp said flanges 15, 17 together when the housing sections are assembled.

There are the out flow lines 20, 20 whose inner ends are inserted into the fittings 16 and either welded therein, as shown in Figure 1, or screwed therein in a manner similar to that shown in Figure 4.

The fittings 16 not only serve as connections for the out flow lines 20 but also anchor the casing head and tubing head together.

The fittings 16 have external annular grooves around the tapering ends thereof and the tubing head seats 13 have registering grooves and in said registering grooves are the packing rings 21, 21 which form seals about the fittings 16.

The lower end of the tubing head has an external groove which registers with the corresponding inside annular groove in the casing head and in said registering grooves there is a packing sleeve 22 which forms an efficient seal between said heads.

The upper end of the tubing head has an external annular flange 23 thereon and, in the form shown in Figure 1, there is a tubular valve casing 24 mounted on the tubing head. The upper end of the tubing head is provided with an internal downwardly tapering seat 25 and the valve casing has a tubular downwardly tapering extension 26 which fits into said seat and has also an external annular flange 27 which rests on the flange 23. The seat 25 and the extension 26 are provided with registering grooves to receive a packing sleeve 28 which forms a seal between them.

The valve casing 24 is clamped onto the tubing head by means of a clamp housing 29 formed of sections which are secured together by the clamp bolts 30 which have heads on one end and clamp nuts threaded onto their other ends.

The upper sides of the flanges 27 taper outwardly and the housing 29 has an inside annular groove whose upper side tapers inwardly and wedges against the upper side of the flange 27 when the sections of the housing 29 are assembled about said flanges and clamped together.

In the valve casing 24 there is a transverse valve seat 31 whose inner end is tapered inwardly and whose outer end is enlarged forming the external outwardly facing annular shoulder 32. Fitted within this valve seat there is a valve 33 which includes the annular seal rings 34 and 34a formed of rubber or similar resilient material and which fit closely within the seat to seal the valve therewith. This valve has a passageway 35 therethrough which may be opened and closed by turning the valve. It is shown in open position in Figure 1. The large end of the valve has a polygonal extension 36 to receive a wrench for turning the valve to open or close the passageway through the tubing head. The other end of the valve 33 has an extended stem 37 which is threaded through a nut 38. This nut has a swivelling connection with the valve casing 24 and is retained in place by a retainer plate 39 which is fitted thereover and is bolted to the casing 24, as shown in Figure 1. When the valve is in either open or closed position the nut 38 may be screwed up tightly to expand the seal ring 34a in the tapered portion of the seat 31 and to clamp the seal ring 34 between the outer end of the valve and shoulder 32 so as to expand said seal ring 34. The seal rings 34 and 34a when thus expanded will prevent leakage past the valve.

As illustrated in Figures 2 and 3 there is a cylindrical housing 40 clamped on the tubing head by means of the clamp housing 29.

Within the housing 40 there is a resilient sleeve 41 through which a pump sucker rod 42 may operate. The packing sleeve 41 is retained in place by means of a gland 43 which is fitted into the upper end of the housing 40 against the upper end of the packing sleeve 41.

The upper end of the housing 40 has an external annular flange 44 and the gland 43 has a similar external flange 45 which fits against the flange 44 and these flanges are clamped together by the clamp housing 46 similar to the housing 29.

The packing sleeve 41 may be made hollow, that is may be formed with an internal annular chamber 47 which may be inflated from a suitable source of pressure through the pressure line 48 which is connected to a nipple 49 carried by the housing 40, as shown in Figure 2. The pressure of the packing sleeve 41 against the sucker rod may thus be regulated so as to form a leak proof joint between them.

The drawings and description are illustrative merely while the broad principle of the invention will be defined by the appended claims.

What I claim is:

1. Well head construction comprising a casing head adapted to be connected to a well casing and having a longitudinal bore provided with a downwardly tapering portion forming an inside seat, and a lateral opening forming an outwardly flared seat in communication with said bore, a tubing head having a lateral opening which registers with the casing head opening said tubing head being seated in said inside seat and having an upper end extending above the casing head, a tubular flow-line connection fitted through the openings of both heads and seated in said outwardly flared seat, said casing head and connection having annular projections provided with external adjoining flanges, a clamp housing around said flanges and securing them together to secure the connection to the head assembly.

2. Well head construction comprising, a casing head adapted to be connected to a well casing and having a longitudinal bore provided with a downwardly tapering portion forming an inside seat and a lateral opening in communication with said bore, a tubing head in said casing head and seated in said inside seat, said tubing head extending above the casing head and having a lateral opening which registers with the casing head opening, a tubular flow-line connection fitted through the openings of both heads, a seal between the connection and tubing head, said casing head and connection having annular projections provided with external adjoining flanges, means clamping the flanges together to secure the connection to the head assembly.

3. A well head construction comprising, an approximately cylindrical casing head having a longitudinal bore provided with a downwardly tapered inside seat, a tubular tubing head fitted into the bore and supported on said seat and whose upper end extends above the casing head, said casing head having sets of external annular projections each projection having an external annular flange and providing an outwardly flared seat communicating with the longitudinal bore, one of said sets being positioned above the downwardly tapered seat in the casing head and another of said sets being located below said tapered seat, tubular flow-line connections extending through said projections and seated in said outwardly flared seats, said connections having external annular flanges adjoining the external flanges of said projections, clamps around said adjoining flanges and securing them together, and flow controlling means on the extended upper end of the tubing head.

4. A well head construction comprising a casing head, adapted to be connected to a well casing and having a longitudinal bore provided with a downwardly tapering portion forming an inside seat, said casing head having upper and lower external annular projections, said upper projections being located above said inside seat and said lower projections being located below said inside seat, each projection having an external annular flange spaced from the casing head, said lower projections having outwardly flared seats in communication with said bore and said upper projections also being in communication with said bore, a tubular tubing head fitted into the bore and supported on said inside seat and whose upper end extends above the casing head, said tubing head having lateral openings providing outwardly flared seats in registration with the upper projections, upper and lower flow-connections associated with the upper and lower projections respectively, said lower flow-connections fitting said outwardly flared seats, in the casing head, and said upper flow connections extending through said upper projections and fitting said outwardly flared seats in the tubing head, said flow connections having external annular flanges adjoining the flanges of the projections, and clamp means around said adjoining flanges and clamping them together.

5. A well head construction comprising a casing head having a longitudinal bore provided with a downwardly tapered inside seat a tubular tubing head within the casing head and supported on said seat and whose upper end extends above the casing head and is adapted for the connection of well head equipment to said tubing head, said casing head having an annular lateral projection providing an outwardly flared seat in communication with said bore beneath the tubing head, an external annular flange integral with the outer end of said projection and spaced from the casing head around said outwardly flared seat, a flow-connection fitting within said outwardly flared seat and having an external annular flange adjoining the casing head flange, clamp means around said adjoining flanges and clamping them together, said connection providing an outlet passageway for fluid from within the casing head, a tubular connection on the casing head above said inside seat and having an external annular flange spaced from the casing head, said tubing head having a lateral opening providing a tapered seat, in registration with said connection, a tubular fitting through the connection and seated in said tubing head seat and having an external annular flange adjoining the flange on said connection, said fitting providing a passageway for the outlet of fluid from within the tubing head and clamp means around said last mentioned adjoining flanges clamping them together.

GRANVILLE A. HUMASON.

REFERENCES CITED

The following references are of record in the file of this patent:

UNITED STATES PATENTS

| Number | Name | Date |
| --- | --- | --- |
| 1,093,868 | Leighty | Apr. 21, 1914 |
| 1,502,106 | Lyne | July 22, 1924 |
| 1,849,374 | McEvoy | Mar. 15, 1932 |
| 1,944,840 | Humason | Jan. 23, 1934 |
| 2,077,480 | Humason | Apr. 20, 1937 |
| 2,077,507 | Yancey | Apr. 20, 1937 |
| 2,134,200 | Pivoto | Oct. 25, 1938 |
| 2,285,222 | Mueller | June 2, 1942 |